(12) United States Patent
Lee

(10) Patent No.: US 11,035,376 B2
(45) Date of Patent: Jun. 15, 2021

(54) TURBO CHARGER

(71) Applicants: Hyundai Motor Company, Seoul (KR); Kia Motors Corporation, Seoul (KR)

(72) Inventor: Jang Sin Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/773,446

(22) Filed: Jan. 27, 2020

(65) Prior Publication Data

US 2021/0095689 A1 Apr. 1, 2021

(30) Foreign Application Priority Data

Oct. 1, 2019 (KR) .......................... 10-2019-0121444

(51) Int. Cl.
*F04D 29/28* (2006.01)
*F04D 29/42* (2006.01)
*F02C 6/12* (2006.01)

(52) U.S. Cl.
CPC .............. *F04D 29/284* (2013.01); *F02C 6/12* (2013.01); *F04D 29/4213* (2013.01); *F05D 2220/40* (2013.01)

(58) Field of Classification Search
CPC ...... F04D 29/284; F04D 29/4213; F02C 6/12; F05D 2220/40; F02B 37/22
See application file for complete search history.

(56) References Cited

FOREIGN PATENT DOCUMENTS

KR 10-2012-0033418 A 4/2012

*Primary Examiner* — Audrey K Bradley
*Assistant Examiner* — Edward Bushard
(74) *Attorney, Agent, or Firm* — Mintz Levin Cohn Ferris Glovsky and Popeo, P.C.; Peter F. Corless

(57) ABSTRACT

A turbo charger is provided. The turbo charger includes a compressor housing having a compressor wheel rotatably installed therein and a sliding block configured to guide an airflow inflowing toward the compressor wheel and to slide along a rotational axis of the compressor wheel to form a slit between the compressor housing and the sliding block. An elastic bias is provided to elastically bias the sliding block in a direction in which the sliding block maximally reduces the size of the slit and a pressurizing device is provided to bias the sliding block in a direction in which the slit is maximally enlarged by air pressure provided by the compressor wheel.

7 Claims, 5 Drawing Sheets

TURBO CHARGER

CROSS REFERENCE TO RELATED APPLICATION

The present application claims priority to Korean Patent Application No. 10-2019-0121444, filed Oct. 1, 2019, the entire contents of which is incorporated herein for all purposes by this reference.

BACKGROUND

Field of the Disclosure

The present disclosure relates to a turbo charger and, more particularly, to a structure of the turbo charger.

Description of the Related Art

A turbo charger transmits rotational force of a turbine wheel driven by exhaust gas of an engine to a compressor wheel through a shaft. The compressor compresses and supplies air to an engine combustion chamber to improve intake efficiency of the engine combustion chamber and improves output performance of the engine. In the turbo charger as described above, airflow noise is generated due to a flow of air injected into the compressor in a high speed operating region having a revolutions per minute (RPM) of 100,000 or more, and the airflow noise causes discomfort due to a high frequency in an audible band of user.

The description provided above as a related art of the present disclosure is intended merely to aid in the understanding of the background of the present disclosure, and is not intended to mean that the present disclosure falls within the purview of the related art that is already known to those skilled in the art.

SUMMARY

The objective of the present disclosure is to provide a turbo charger that enables effectively reducing or attenuating airflow noise in a high speed operating region of the turbo charger, and increasing an inherent pumping performance of the turbo charger in a medium speed and low speed operating region to thus provide balanced effects for both mechanical pumping performance and noise attenuating performance of the turbo charger.

The present disclosure provides a turbo charger that may include: a compressor housing having a compressor wheel rotatably provided therein; a sliding block configured to guide an airflow inflowing toward the compressor wheel and to slide along a rotational axis of the compressor wheel to form a slit between the compressor housing and the sliding block; an elastic bias provided to elastically bias the sliding block in a direction in which the sliding block maximally reduces a size of the slit; and a pressurizing device provided to bias the sliding block in a direction in which the slit is maximally enlarged by air pressure provided by the compressor wheel.

The elastic bias may include: a spring chamber disposed in the compressor housing and having a cross-section that is open toward the sliding block; a spring inserted in the spring chamber; and a block protrusion that protrudes from an outer circumference surface of the sliding block to move along with the sliding block while being biased by the spring in the spring chamber. The pressurizing device may include: a pressure chamber disposed in the compressor housing and having a cross-section that is open toward an end part of the sliding block to apply the air pressure to an end part of the compressor wheel of the sliding block; and a connecting passage that connects a scroll of the compressor housing to the pressure chamber.

The slit may be formed in a circular shape concentric with the rotational axis of the compressor wheel. Additionally, the slit may be disposed at a position where the airflow inflowing toward the compressor wheel through a central part of the sliding block meets with the compressor wheel. The sliding block may be formed in a circular pipe shape concentric with the rotational axis of the compressor wheel, and a block protrusion constituting a part of the elastic bias may be integrally provided on an outer circumference surface of the sliding block.

An end part of the sliding block toward the compressor wheel may include an outer end part which is pressurized by the pressurizing device and an inner end part which protrudes further from a pressurized part of the outer end part toward the compressor wheel to form the slit, and the inner end part may form a smooth connection surface (e.g., substantially even surface), without providing a step with an inner surface of the compressor housing, in a state in which the inner end part is moved to the compressor wheel to maximally reduce the size of the slit.

The present disclosure effectively reduces or attenuates airflow noise in the high speed operating region of the turbo charger, and enables increasing the inherent pumping performance of the turbo charger in the medium speed and low speed operating region.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
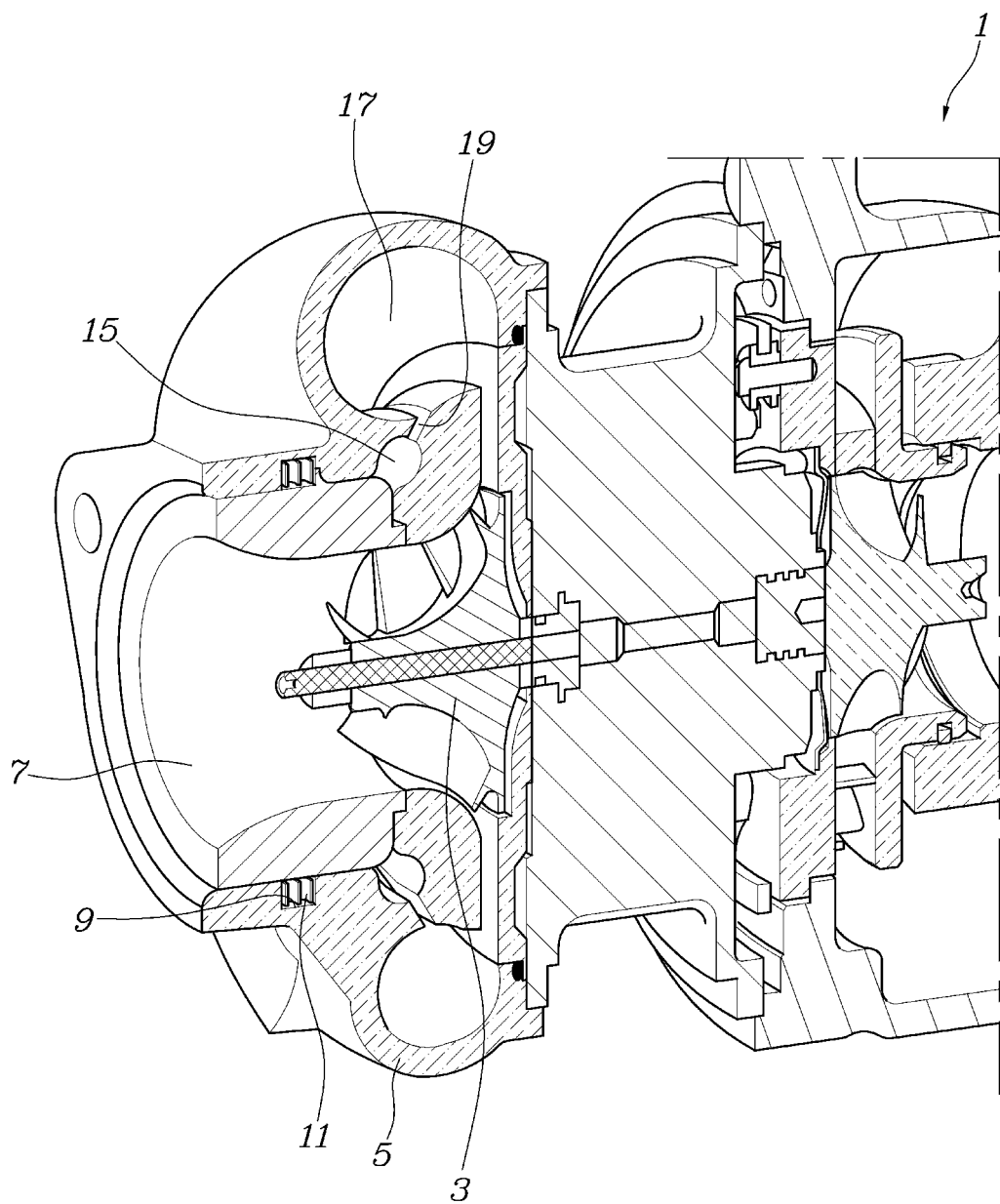
FIG. 1 is a view illustrating a structure of a turbo charger according to an exemplary embodiment of the present disclosure.
Figure 2:
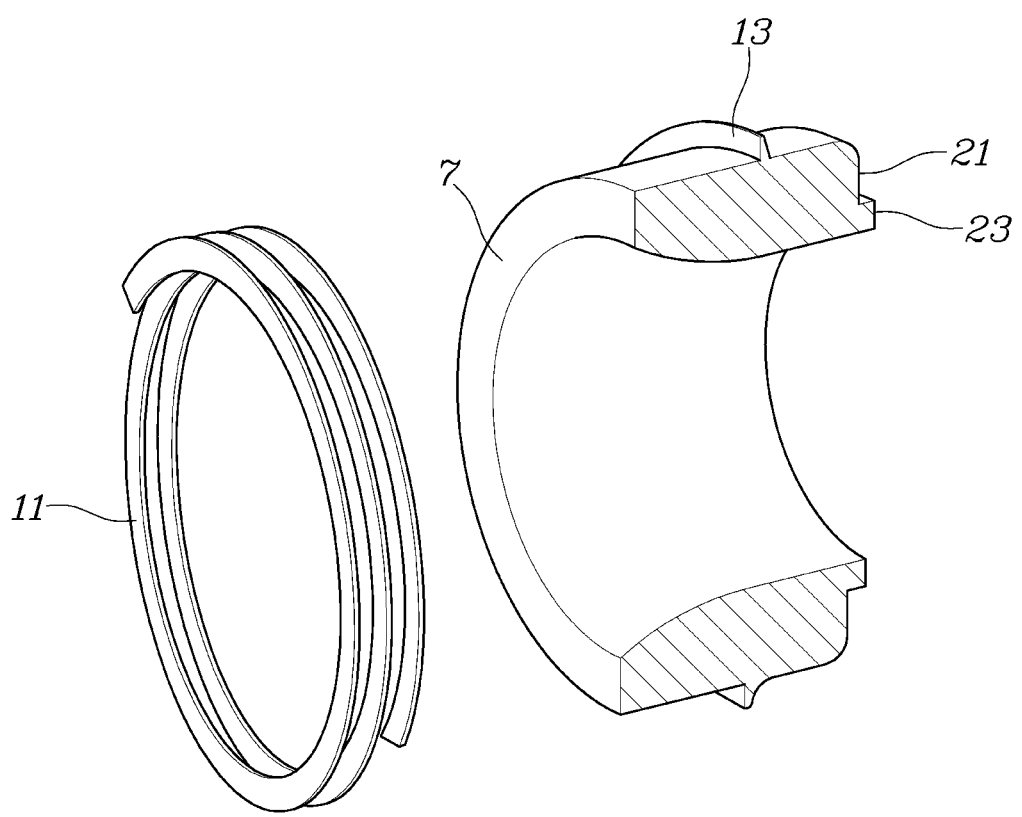
FIG. 2 is a view illustrating a sliding block and a spring of FIG. 1 according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Referring to FIGS. 1 to 4, an exemplary embodiment of the disclosure turbo charger 1 may include: a compressor housing 5 having a compressor wheel 3 rotatably installed therein; a sliding block 7 configured to guide an airflow flowing in toward the compressor wheel 3 and to slide along a rotational axis direction of the compressor wheel 3 to form a slit S between the compressor housing 5 and the sliding block 7; an elastic bias (e.g., elastic biasing device) provided to elastically bias the sliding block 7 in a direction in which the sliding block 7 maximally reduces the slit S; and a pressurizing device provided to bias the sliding block 7 in a direction in which the slit S is maximally extended by air pressure provided by the compressor wheel 3.

In other words, a part around an air inlet of the compressor housing 5 may be divided by the sliding block 7. The sliding block 7 may slide by the elastic bias and the pressurizing device to switch between states of forming and removing the slit S which may reduce airflow noise in a passage of the air flowing into the compressor wheel 3.

In this exemplary embodiment, the elastic bias may include: a spring chamber 9 disposed in the compressor housing 5 in a cross-sectional shape opened toward the sliding block 7; a spring 11 inserted in the spring chamber 9; and a block protrusion 13 that protrudes from an outer circumference surface of the sliding block 7 to move along with the sliding block 7 while being biased by the spring 11 in the spring chamber 9. In addition, the pressurizing device may include: a pressure chamber 15 formed in a cross-sectional shape and opened toward an end part of the sliding block 7 in the compressor housing 5 to apply air pressure to an end part of the compressor wheel 3 of the sliding block 7; and a connecting passage 19 that connects a scroll 17 of the compressor housing 5 to the pressure chamber 15.

Figure 3:
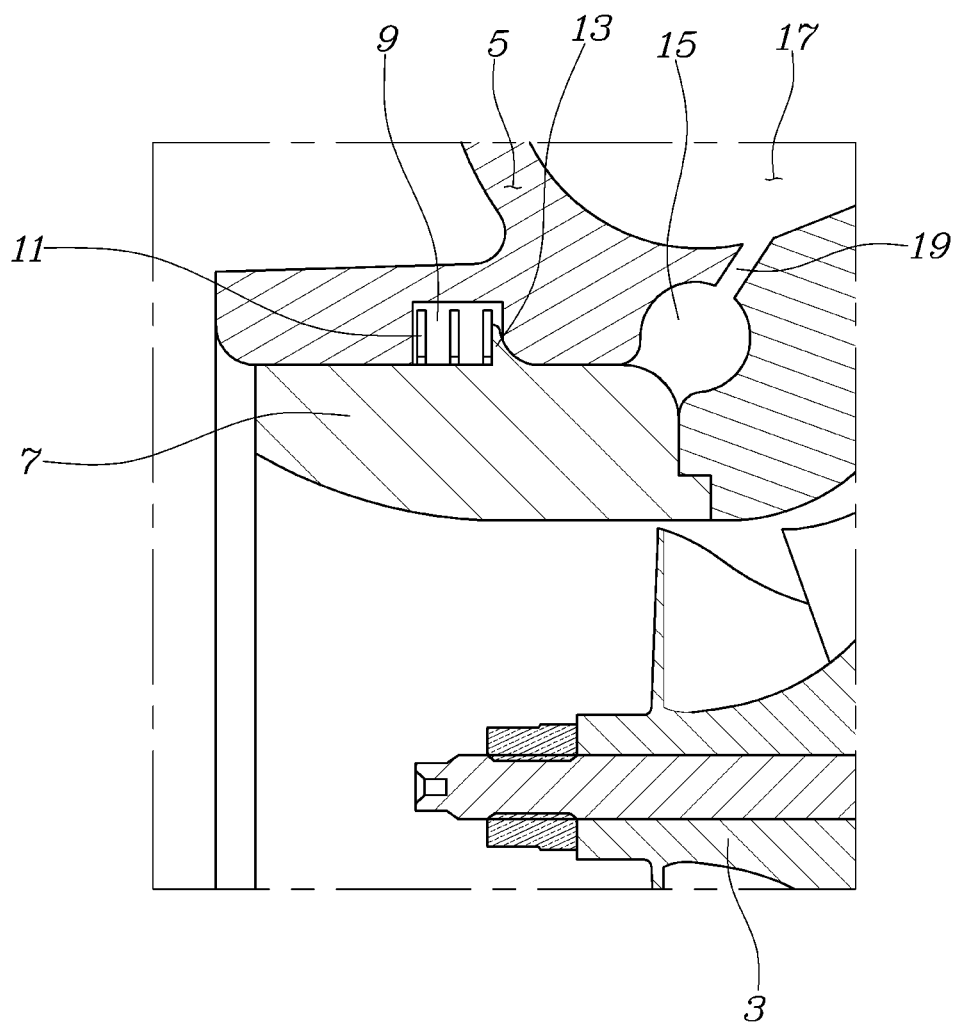
FIG. 3 is a view illustrating a state in which the turbo charger of FIG. 1 does not form a slit at a low medium speed according to an exemplary embodiment of the present disclosure.
Figure 4:
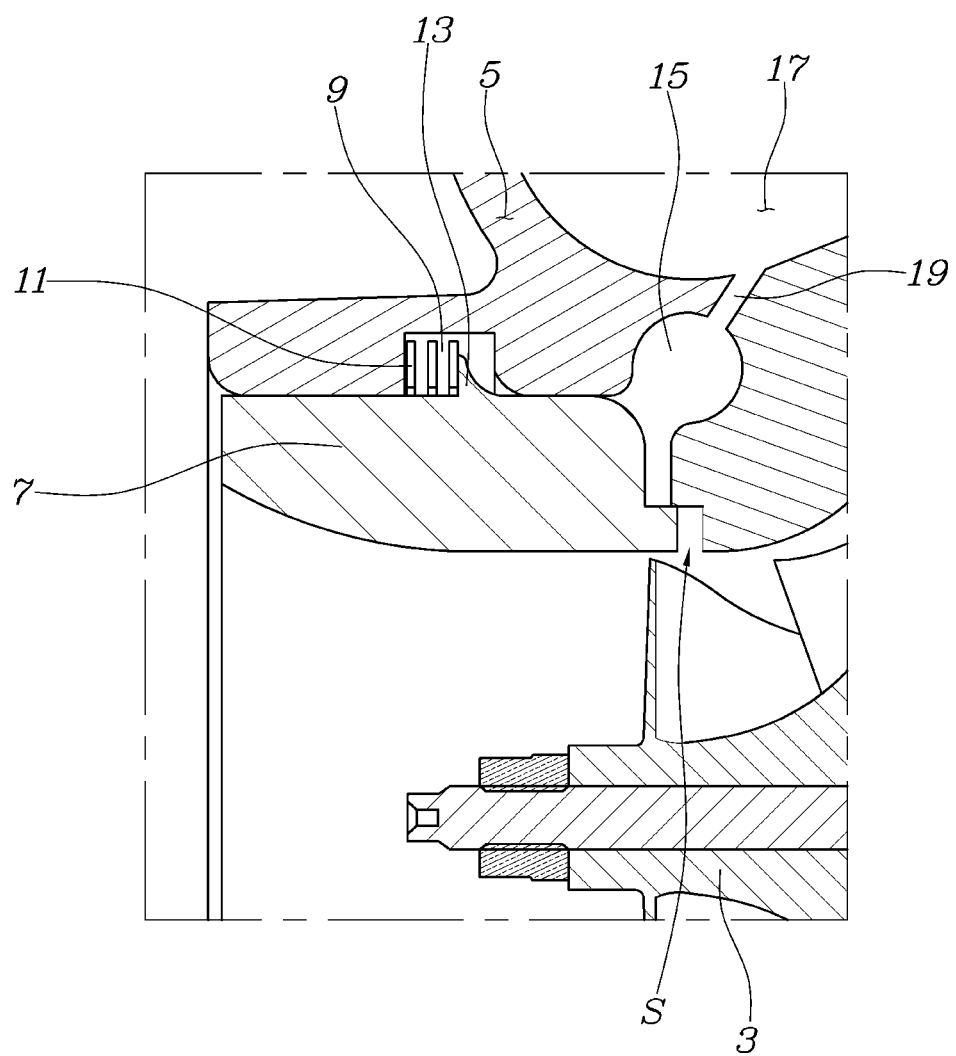
FIG. 4 is a view illustrating a state in which the turbo charger of FIG. 1 forms a slit at a high speed according to an exemplary embodiment of the present disclosure.

Therefore, in the present disclosure, when the pressure chamber 15 is provided with insufficient pressure to compress the spring 11, as shown in FIG. 3, the sliding block 7 may be moved toward the compressor wheel 3 by the force of the spring 11, and thus the slit S may be removed from between the compressor housing 5 and the sliding block 7. On the other hand, when the pressure of the pressure chamber 15 increases and the sliding block 7 moves as shown in FIG. 4 while compressing the spring 11, the slit S may be formed between the compressor housing 5 and sliding block 7 to reduce or attenuate airflow noise due to the high speed operation of the compressor.

Figure 5:
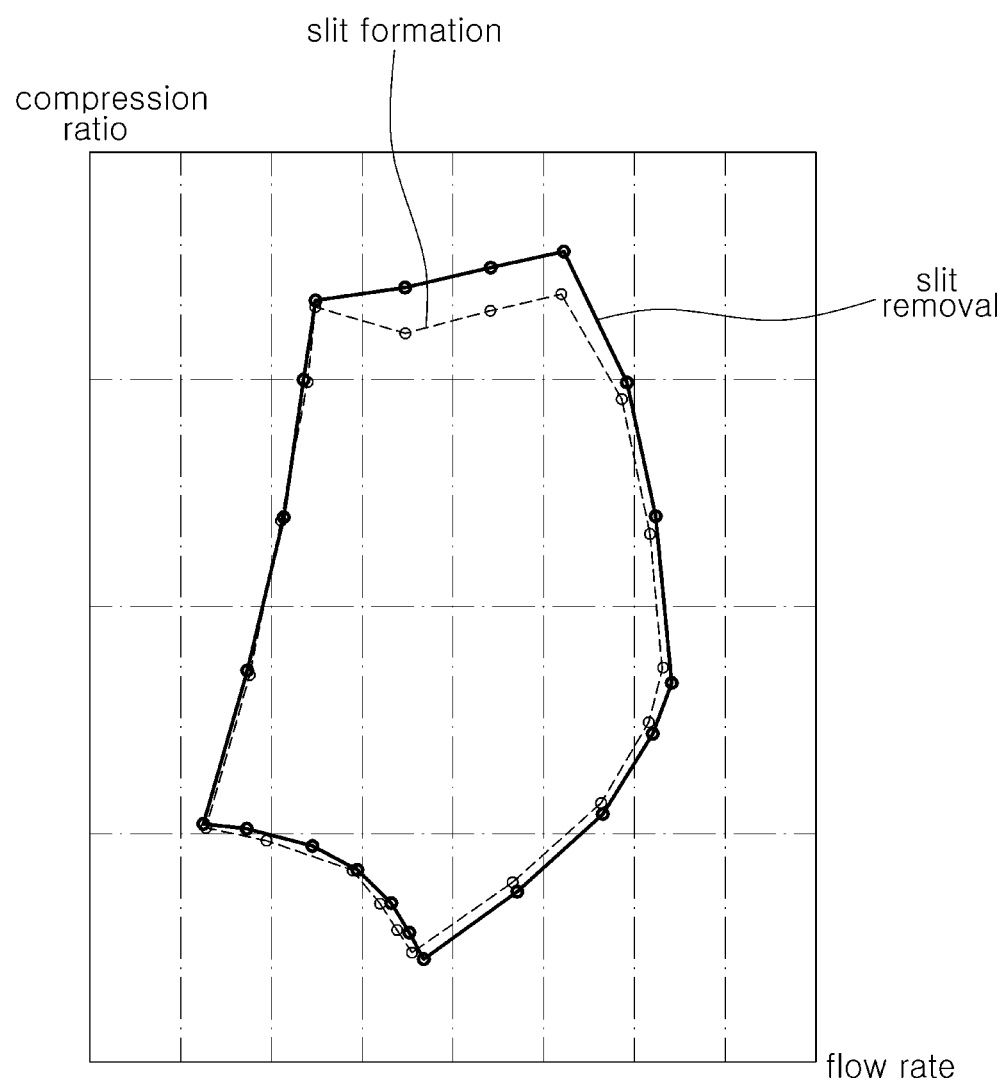
FIG. 5 is a graph illustrating a comparison between a performance of the turbo charger according to an exemplary embodiment of the present disclosure when the slit is formed and when the slit is removed.

Furthermore, when a state of removing the airflow noise as described above is changed to a state of operating in medium to low speeds operating region in which the pressure of the pressure chamber 15 decreases, the sliding block 7 may be moved back to the state as shown in FIG. 3 by the elastic force of the spring 11 to remove the slit S. Therefore, when the slit S is removed, the maximum performance of the compressor of the turbo charger 1 may be realized. In other words, as illustrated in FIG. 5, at the same flow rate, a performance curve in the state where the slit S is removed has a higher compression ratio compared to a compression ratio of the performance curve in the state where the slit S is formed, and the choke line in FIG. 5 is further shifted toward the high flow rate, thereby having improved properties.

Accordingly, the present disclosure enables that in an operating region where the compressor is operated at medium to low speeds and the airflow noise is essentially not a problem, the compressor exhibits a maximum operational performance. Additionally, the present disclosure enables that in an operating region where the compressor is operated at high speed and the air flow noise is generated by the compressor, the slit S is to be formed spontaneously. The present disclosure thus reduces or attenuates the airflow noise problem.

The slit S may be formed spontaneously in the operating region where the airflow noise is generated to remove the airflow noise because when the compressor wheel 3 rotates at a relatively high speed, pressure in the scroll 17 of the compressor housing 5 gradually increases accordingly; when the pressure acts on the pressure chamber 15 through the connecting passage 19 from the scroll 17, the pressure acting on the sliding block 7 also increases according to the speed of the compressor wheel 3; and thus the slit S may be formed spontaneously, overcoming the elastic force of the spring 11 and sliding.

In this exemplary embodiment, the slit S may be formed in a circular shape concentric with a rotational axis of the compressor wheel 3, and the air flowing toward the compressor wheel 3 through the central part of the sliding block 7 is provided at a position where the air meets with the compressor wheel 3. The position where the airflow meets the compressor wheel 3 is the position where the effect of reducing the airflow noise is optimal due to the formation of the slit S determined through a number of related experiments and analyses.

The sliding block 7 may be formed as a circular pipe shape concentric with the rotational axis of the compressor wheel 3. A block protrusion 13 constituting a part of the elastic bias may be integrally provided on an outer circumference surface of the sliding block 7. In other words, by the block protrusion 13, the sliding block 7 may receive the elastic force from the spring 11 constituting the elastic bias. An end part of the sliding block 7 toward the compressor wheel 3 may include an outer end part 21 pressurized by the pressurizing device, and an inner end part 23 which protrudes further from a part under pressure of the outer end part toward the compressor wheel 3 to form the slit S.

In other words, by being exposed to the pressure chamber 15, the outer end part 21 of the sliding block 7 may be positioned to receive the pressure transmitted from the scroll 17 through the connecting passage 19. Together with the compressor housing 5, the inner end part 23 of the sliding block 7 may form or remove the slit S. The inner end part 23 may form a smooth connection surface, without forming a step with an inner surface of the compressor housing 5, in a state in which the inner end is moved to the compressor wheel 3 to maximally reduce the size of the slit S. Therefore, the air flowing toward the compressor wheel 3 through the central part of the sliding block 7 may flow smoothly along the smooth passage provided by the sliding block 7 and the compressor housing 5, thereby substantially increasing the performance of the compressor.

While the present disclosure has been illustrated and described with respect to particular exemplary embodiments, it will be apparent to those skilled in the art that various changes and modifications can be embodied in many different forms without departing from the spirit of the present disclosure provided by the following claims.

What is claimed is:

1. A turbo charger, comprising:
    a compressor housing having a compressor wheel rotatably provided therein;
    a sliding block configured to guide an airflow flow in toward the compressor wheel and to slide along a rotational axis of the compressor wheel to form a slit between the compressor housing and the sliding block;
    an elastic bias disposed to elastically bias the sliding block in a direction in which the sliding block maximally reduces a size of the slit; and
    a pressurizing device provided to bias the sliding block in a direction in which the slit is maximally enlarged by air pressure provided by the compressor wheel.

2. The turbo charger of claim 1, wherein the elastic bias includes:
    a spring chamber disposed in the compressor housing and having a cross-section that is open toward the sliding block;
    a spring inserted in the spring chamber; and
    a block protrusion that protrudes from an outer circumference surface of the sliding block to move along with the sliding block while being biased by the spring in the spring chamber.

3. The turbo charger of claim 1, wherein the pressurizing device includes:
    a pressure chamber disposed in the compressor housing and having a cross-section that is open toward an end part of the sliding block to apply the air pressure to an end part of the compressor wheel of the sliding block; and
    a connecting passage that connects a scroll of the compressor housing to the pressure chamber.

4. The turbo charger of claim 1, wherein the slit is formed in a circular shape concentric with the rotational axis of the compressor wheel.

5. The turbo charge of claim 4, wherein the slit is provided at a position where the airflow flow in toward the compressor wheel through a central part of the sliding block meets with the compressor wheel.

6. The turbo charge of claim 4, wherein the sliding block is formed in a circular pipe shape concentric with the rotational axis of the compressor wheel, and a block protrusion constituting a part of the elastic bias is integrally provided on an outer circumference surface of the sliding block.

7. The turbo charger of claim 6, wherein an end part of the sliding block toward the compressor wheel includes:
    an outer end part which is pressurized by the pressurizing device; and
    an inner end part which protrudes further from a pressurized part of the outer end part toward the compressor wheel to form the slit,
    wherein the inner end part forms a smooth connection surface when the inner end part is moved to the compressor wheel to maximally reduce the size of the slit.

* * * * *